(12) United States Patent
Kurashima

(10) Patent No.: US 10,261,270 B2
(45) Date of Patent: Apr. 16, 2019

(54) OPTICAL TRANSCEIVER

(71) Applicant: Sumitomo Electric Industries, Ltd., Osaka-shi (JP)

(72) Inventor: Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/812,453

(22) Filed: Nov. 14, 2017

(65) Prior Publication Data

US 2018/0136416 A1  May 17, 2018

(30) Foreign Application Priority Data

Nov. 14, 2016 (JP) .................................. 2016-221729

(51) Int. Cl.
  *G02B 6/38*  (2006.01)
  *G02B 6/42*  (2006.01)
  *H04B 10/40*  (2013.01)

(52) U.S. Cl.
  CPC ......... *G02B 6/3893* (2013.01); *G02B 6/3879* (2013.01); *G02B 6/3897* (2013.01); *G02B 6/4206* (2013.01); *G02B 6/4246* (2013.01); *G02B 6/4292* (2013.01); *H04B 10/40* (2013.01); *G02B 6/3885* (2013.01); *G02B 6/3887* (2013.01); *G02B 6/428* (2013.01)

(58) Field of Classification Search
  None
  See application file for complete search history.

(56) References Cited

U.S. PATENT DOCUMENTS

| 9,354,403 | B2 | 5/2016 | Seetharam et al. | |
| 2005/0111796 | A1* | 5/2005 | Matasek | G02B 6/3825 385/55 |
| 2011/0044583 | A1* | 2/2011 | Dalton | G02B 6/3825 385/53 |

* cited by examiner

*Primary Examiner* — Chad H Smith
(74) *Attorney, Agent, or Firm* — Baker Botts L.L.P.; Michael A. Sartori

(57) ABSTRACT

An optical transceiver according to an embodiment is an optical transceiver that is engageable with an MPO connector in a longitudinal direction, and includes: a housing having a first inner surface on an inner side thereof and made of a metal; and an MPO receptacle that has a receptacle main body that has a first outer surface and is made of a metal, and a latch that determines a position of the receptacle main body which is perpendicular to the longitudinal direction with respect to the housing, and that is engaged with the MPO connector. The receptacle main body is fixed to the housing such that the first outer surface of the receptacle main body comes into close contact with the first inner surface of the housing.

12 Claims, 9 Drawing Sheets

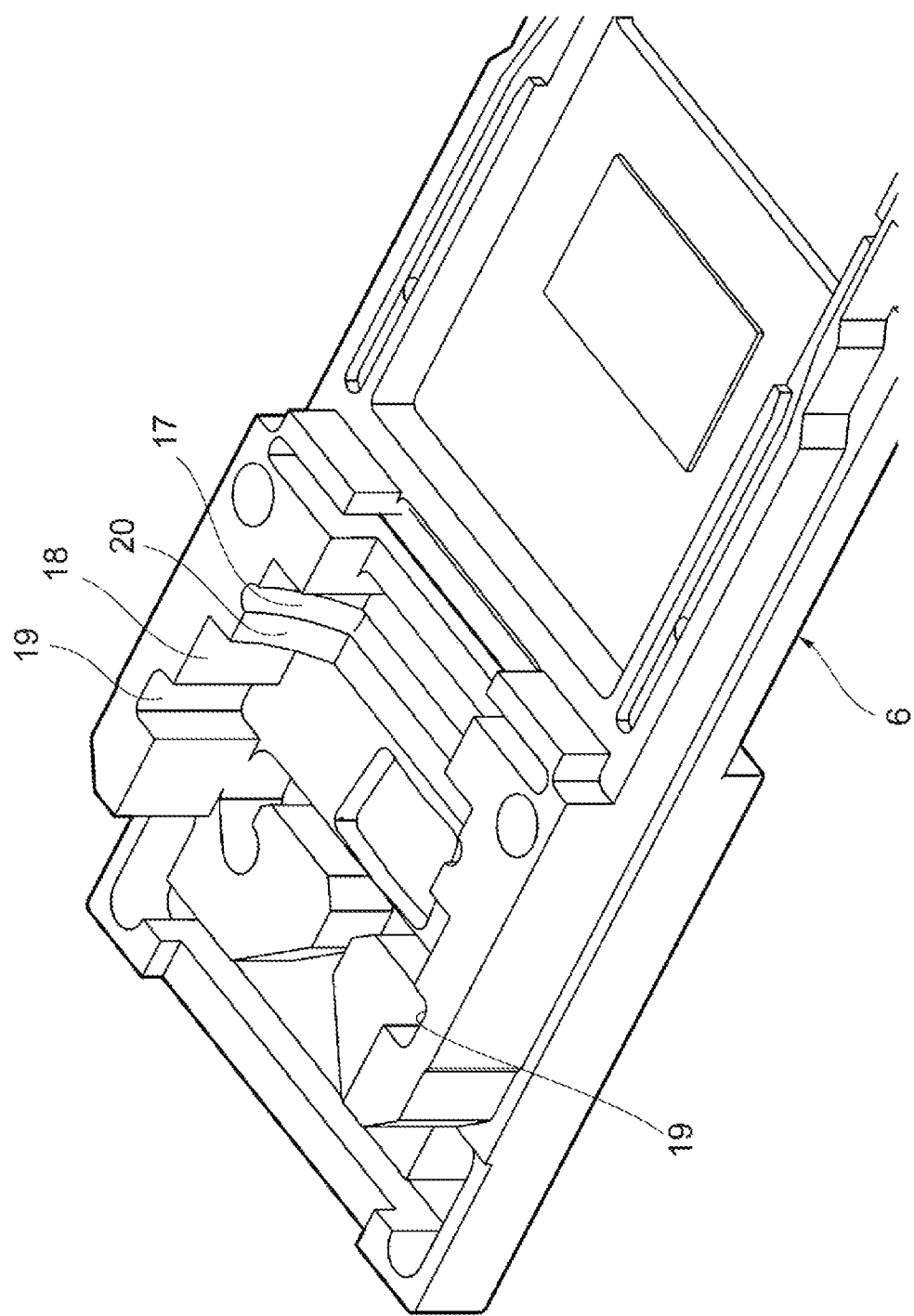

OPTICAL TRANSCEIVER

TECHNICAL FIELD

The present invention relates to an optical transceiver.

BACKGROUND

An optical transceiver having an MPO connector is described in U.S. Pat. No. 9,354,403. This optical transceiver includes a housing. The MPO connector is fixed in the housing. The MPO connector is movable in the housing within a limited range. An MT ferrule is disposed inside the housing. This optical transceiver further includes a shield structure of the MT ferrule. The movability of the MPO connector may degrade shield performance of the optical transceiver.

SUMMARY

An optical transceiver according to an aspect of the present invention is an optical transceiver that is engageable with an MPO connector in a longitudinal direction, and includes a housing and MPO receptacle. The housing has a first inner surface on an inner side thereof, and made of a metal. The MPO receptacle has a receptacle main body and a latch. The receptacle main body has a first outer surface and a latch configured to determine a position of the receptacle main body which is perpendicular to the longitudinal direction with respect to the housing. The MPO receptacle is configured to engage with the MPO connector. The receptacle main body is made of a metal. The latch is made of a resin. The receptacle main body is fixed to the housing such that the first outer surface of the receptacle main body comes into tight contact with the first inner surface of the housing.

BRIEF DESCRIPTION OF THE DRAWINGS

FIG. 9 is a perspective view of an inner surface of the housing.

DETAILED DESCRIPTION

Figure 1:
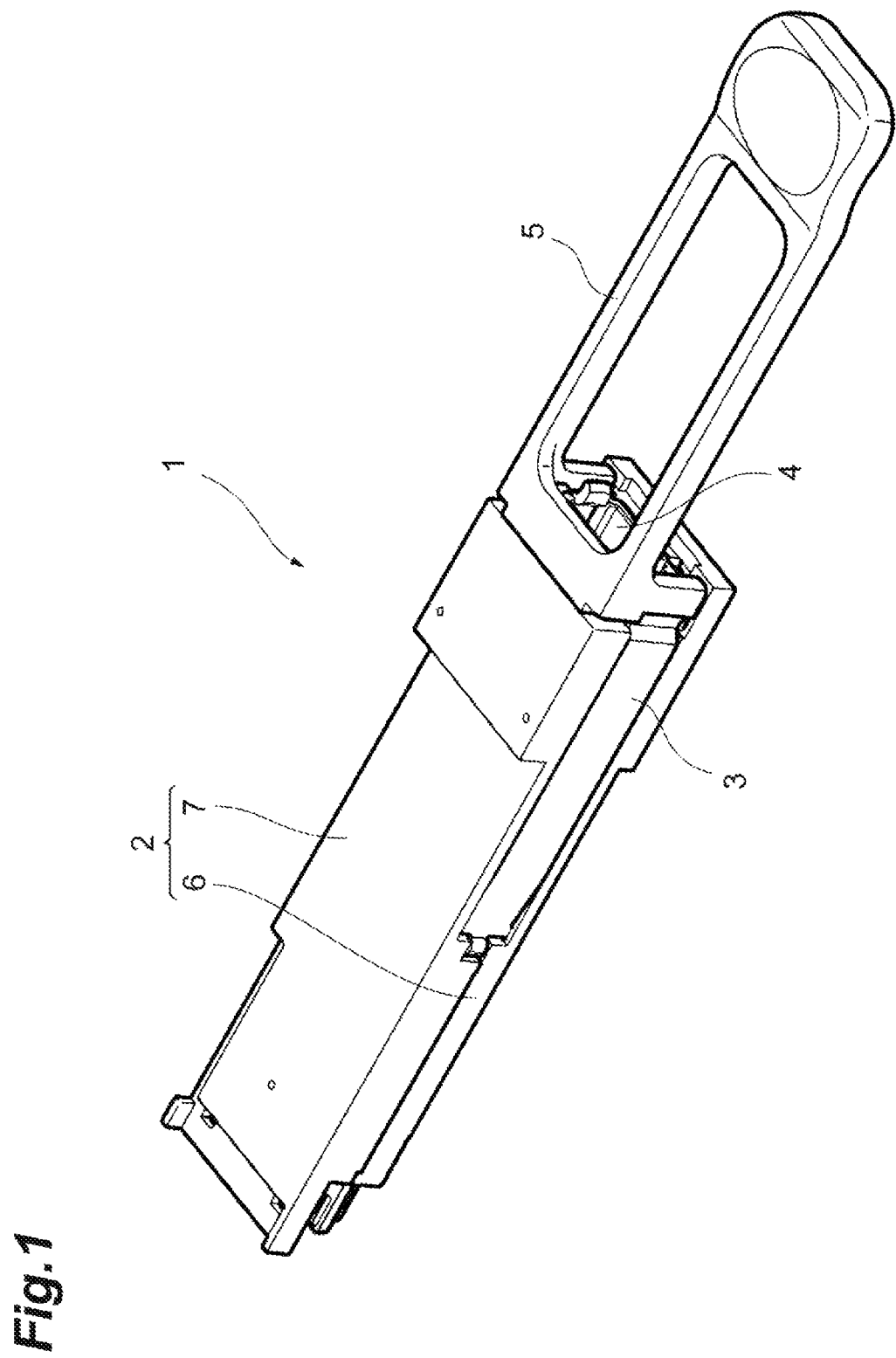
FIG. 1 is a perspective view of an optical transceiver according to an embodiment of the present invention.

Hereinafter, an optical transceiver according to an embodiment of the present invention will be described in detail with reference to the attached drawings. In the description of the drawings, identical or equivalent elements are given the same reference characters, and duplicate description thereof will be omitted.

FIG. 1 is a perspective view of an optical transceiver 1 according to an embodiment of the present invention. The optical transceiver 1 is inserted into a cage of a host system (transmission system) when used. The optical transceiver 1 conducts full-duplex bidirectional communication. A configuration of the optical transceiver 1 is accordance with for example a QSFP standard that is one of multi-source agreements (MSA) standardized by transceiver suppliers. As illustrated in FIG. 1, the optical transceiver 1 includes a transceiver main body (a housing) 2 made of a metal, a slider 3 engaged with the transceiver main body 2, an MPO receptacle 4 located at one end of the transceiver main body 2, and a pull-tab 5 that extends from the slider 3. The transceiver main body 2 has a cuboidal shape that extends in a direction (a longitudinal direction) in which the pull-tab 5 is located. An optical subassembly, an electronic circuit, etc. are housed in the transceiver main body 2. The transceiver main body 2 includes a lower housing 6, and an upper housing 7 that is combined with the lower housing 6 to provide an internal space. The upper housing 7 covers the lower housing 6. The insides of the lower and upper housings 6 and 7 face each other, and the lower and upper housings 6 and 7 are met and fixed by screws or the like, and thereby the transceiver main body 2 is formed. The lower and upper housings 6 and 7 combined to constitute the optical transceiver 1 are referred to as a housing. The housing is formed of a metal.

The MPO receptacle 4 is provided at one end of the lower housing 6. An external MT ferrule, having a plurality of optical fibers, of an external MT connector can be inserted or extracted into or from the MPO receptacle 4. Engagement of the external MT ferrule with the MPO receptacle 4 enables an electric circuit inside the MPO receptacle 4 to communicate with the external MT ferrule outside the MPO receptacle 4. The pull-tab 5 is made of a resin. The slider 3 is interlocked with movement of the pull-tab 5, and is movable in a longitudinal direction of the optical transceiver 1 within a limited range.

Figure 2:
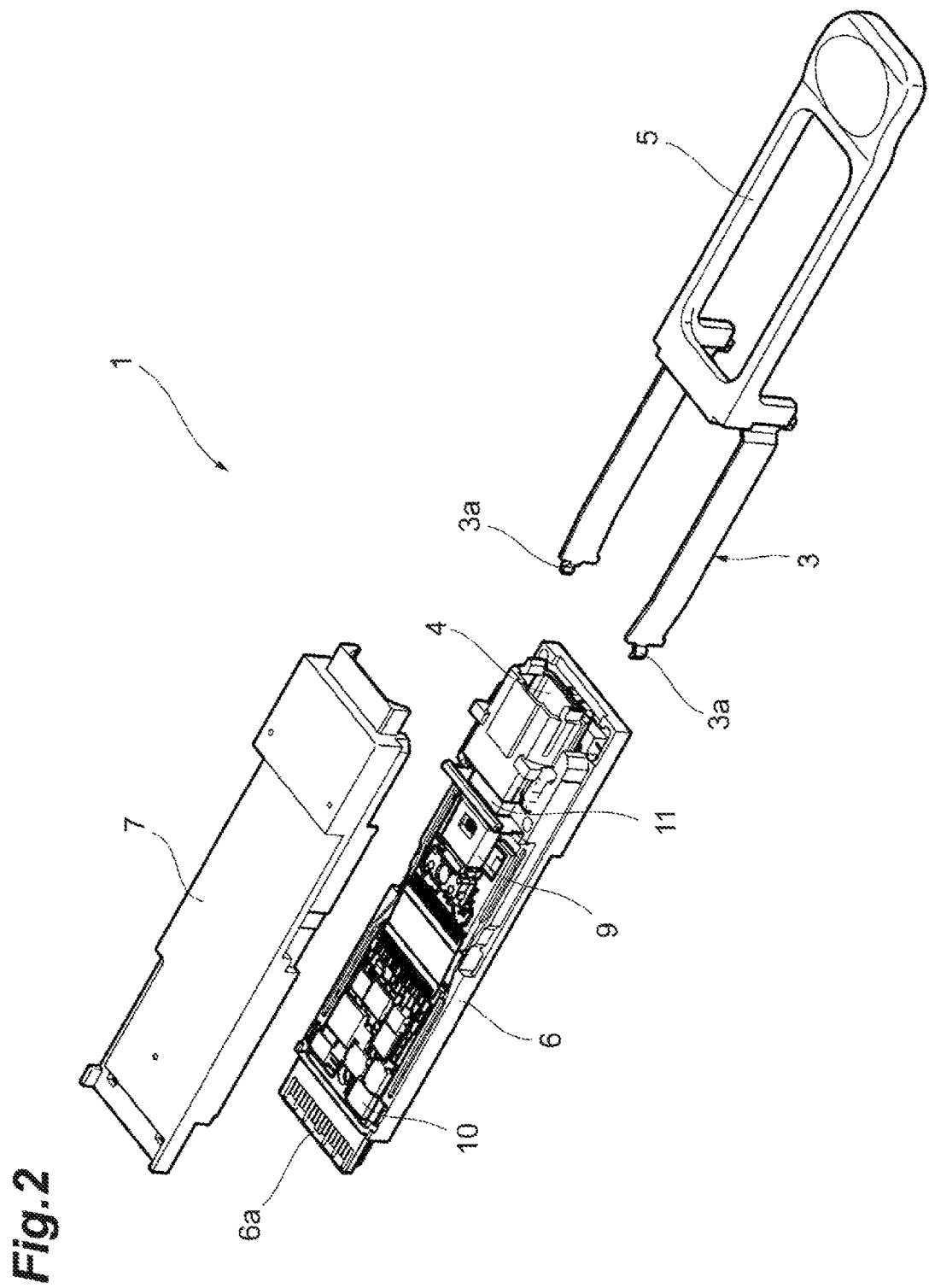
FIG. 2 is an exploded perspective view of the optical transceiver of FIG. 1.

FIG. 2 is an exploded perspective view of the optical transceiver 1. As illustrated in FIG. 2, an optical subassembly 9 and an electric circuit 10 are mounted inside the main body 2. The optical subassembly 9 is disposed closer to the MPO receptacle 4 than the electric circuit 10. The optical transceiver 1 has an electric plug 6a behind a circuit board on which the electric circuit 10 is mounted (in a direction away from the MPO receptacle 4). In the following description, in the optical transceiver 1, a side having the MPO receptacle 4 may be referred to as a front side, a side having the electric plug 6a as a rear side, an axis extending backward and forward (in a longitudinal direction) as a long axis, and an axis perpendicular to the long axis as a horizontal axis. The long axis is parallel to an optical axis of the MPO receptacle 4.

When the external MT ferrule is not inserted into the MPO receptacle 4, if the pull-tab 5 is pulled forward, the slider 3 is pulled to move to the front side. Simultaneously, protrusions 3a formed at rear ends of the slider 3 press and open outward stoppers built in a cage (not shown) engaged with the optical transceiver 1. Thereby, engagement between the cage and the optical transceiver 1 is released, and the optical transceiver 1 can be pulled out of the cage. When the external MT ferrule is inserted into the MPO receptacle 4, a motion of pulling the pull-tab 5 (the slider 3) forward is obstructed. Accordingly, the engagement between the optical transceiver 1 and the cage cannot be released.

Optical coupling is performed between the MPO receptacle 4 and the optical subassembly 9 through a plurality of internal fibers. MT ferrules 11 are attached to opposite ends of the internal fibers, respectively. Namely, the MT ferrule 11 attached to one of the opposite ends (one of the two MT ferrules) is inserted into the MPO receptacle 4 toward the rear side. On the other hand, the external MT ferrule (the other of the two MT ferrules) is inserted into the MPO receptacle 4 toward the other of the opposite ends from the front side. In this way, optical coupling of a plurality of optical fibers inside the MPO receptacle 4 is realized by two MT ferrules. A plurality of light-receiving elements and a plurality of light-emitting elements are mounted in the optical subassembly 9. The light-receiving elements and the light-emitting elements are optically coupled with the inner one of the MT ferrules 11. The above configuration allows the optical transceiver 1 to transceive multichannel optical signals through the respective optical fibers.

Figure 3:
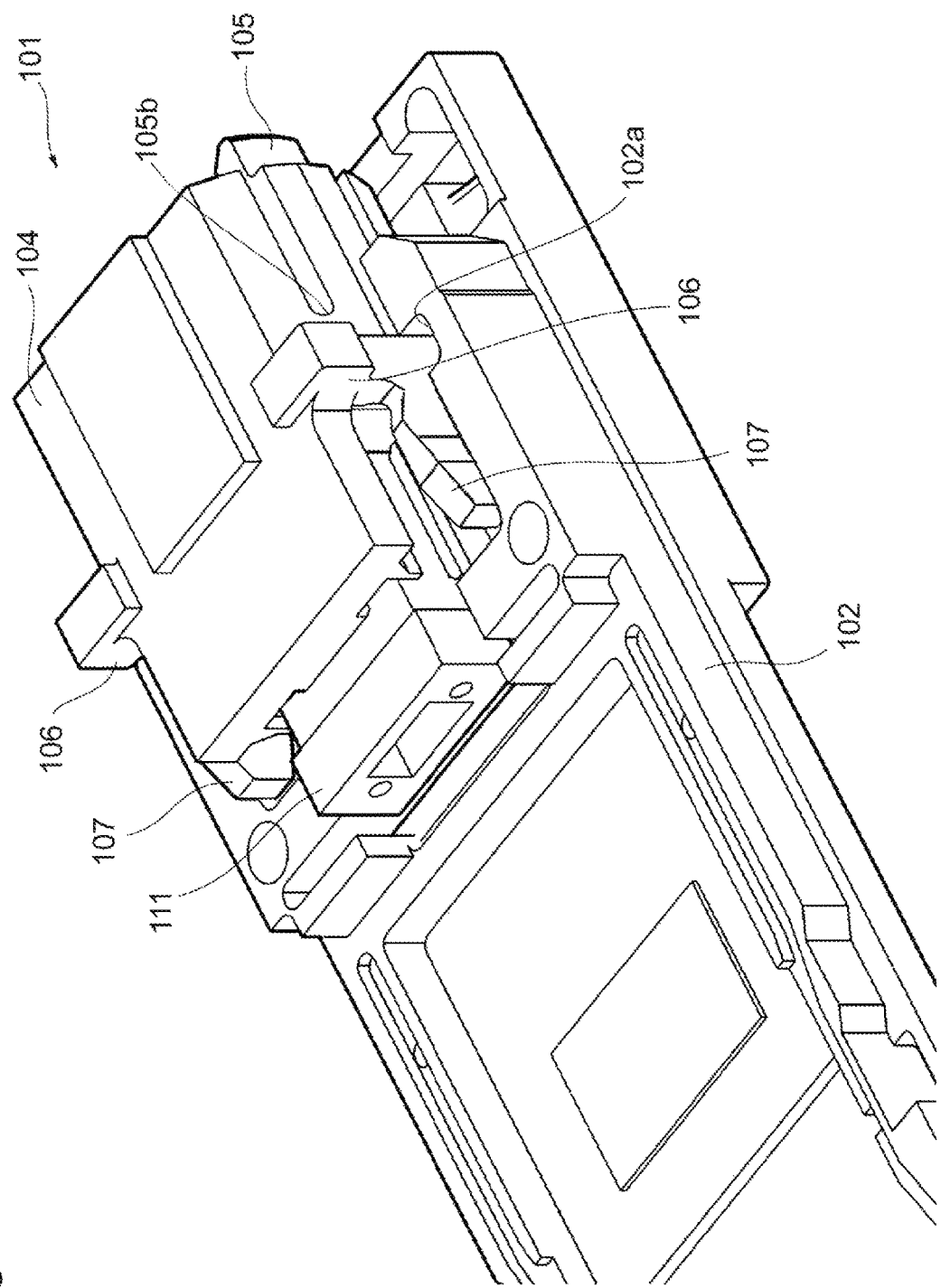
FIG. 3 is a perspective view of a front portion of an optical transceiver of a comparative example.

Next, an optical transceiver 101 of a comparative example will be described. FIG. 3 is a perspective view of a front portion of an optical transceiver 101 on which an MPO receptacle 104 according to a comparative example is mounted. The MPO receptacle 104 is made of a resin, and has an opening to receive an external connector inserted from a front side. Two sidewalls of this opening have MPO latches 105 with which the external connector can be engaged. Each of the MPO latches 105 includes two slits 105b parallel to an optical axis in a sidewall thereof, and has flexibility at a portion that is interposed between the slits 105b.

Protrusions, which protrude to the inside of the opening of the MPO receptacle 104, are provided at tips of the MPO latches 105. The protrusions can hold a rear wall of an external MT ferrule (a wall located distant from the MPO receptacle 104) toward the MPO receptacle 104. The external MT ferrule can be engaged with an internal MT ferrule 111 in the MPO receptacle 104. Abutting of the external MT ferrule with the internal MT ferrule 111 requires a stronger force than in the case of a single fiber connector in order to obtain reliable optical coupling on a plurality of optical fibers (e.g., 12 or 24 optical fibers). Therefore, it is necessary to increase a force with which the MPO latches 105 are bent. To provide a large flexible force at the MPO latches 105, the MPO receptacle 104 is formed of, for instance, a resin having a sufficient thickness. The MPO receptacle 104 of the comparative example has flanges 106 outside two sidewalls thereof, and the flanges 106 can be fitted into grooves 102a formed in a lower housing 102.

Meanwhile, if the MPO receptacle 104 is completely fixed to the lower housing 102, an intended optical coupling mechanism (optical coupling performance) cannot be provided. Therefore, the MPO receptacle 104 is preferably movable relative to the lower housing 102 within a limited range. However, if a fitting between the lower housing 102 and the MPO receptacle 104 is too loose, the MPO receptacle 104 may rattle with respect to the lower housing 102. To prevent such rattling, the MPO receptacle 104 according to the comparative example includes lateral claws 107 that widen from rear surfaces of the flanges 106 toward the rear side in a horizontal direction, and tips of the lateral claws 107 are pressed against an inner surface of the lower housing 102. A flexible force (an elastic force) of the lateral claws 107 is smaller than that of the MPO latches 105. That is, a thickness of each of the lateral claws 107 is thinner than that of each of the MPO latches 105. In this way, the lateral claws 107 allows a position of the MPO receptacle 104 to be adjusted inside the lower housing 102, and prevents the MPO receptacle 104 from rattling with respect to the lower housing 102.

In the comparative example of FIG. 3, as described above, the flanges 106 and the lateral claws 107 are put in the MPO receptacle 104, and thereby a shape of the MPO receptacle 104 is complicated. For this reason, tight contact between an outer surface of the MPO receptacle 104 and the inner surface of the lower housing 102 is relatively loosened. Then, leakage of electromagnetic waves caused by the loosened contact degrades shield performance of the optical transceiver 101. Accordingly, a structure in which a shield plate abutting on a rear wall of the MT ferrule 111 is separately provided and the optical fibers pass through an opening of the shield plate may be adopted. However, in this structure, the number of parts is greater, and the structure is more complicated.

Figure 4:
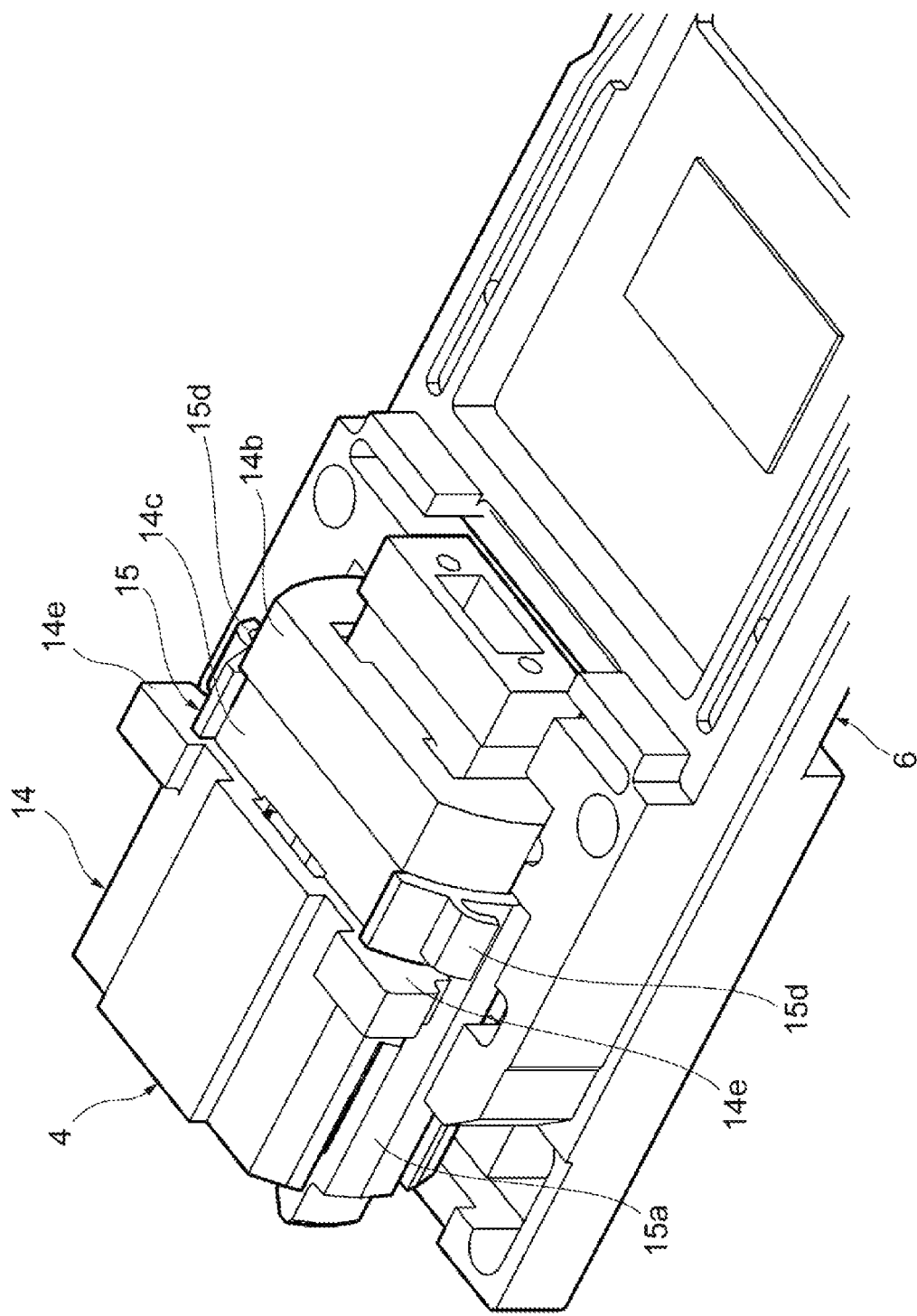
FIG. 4 is a perspective view of an MPO receptacle of the optical transceiver of FIG. 1.
Figure 5:
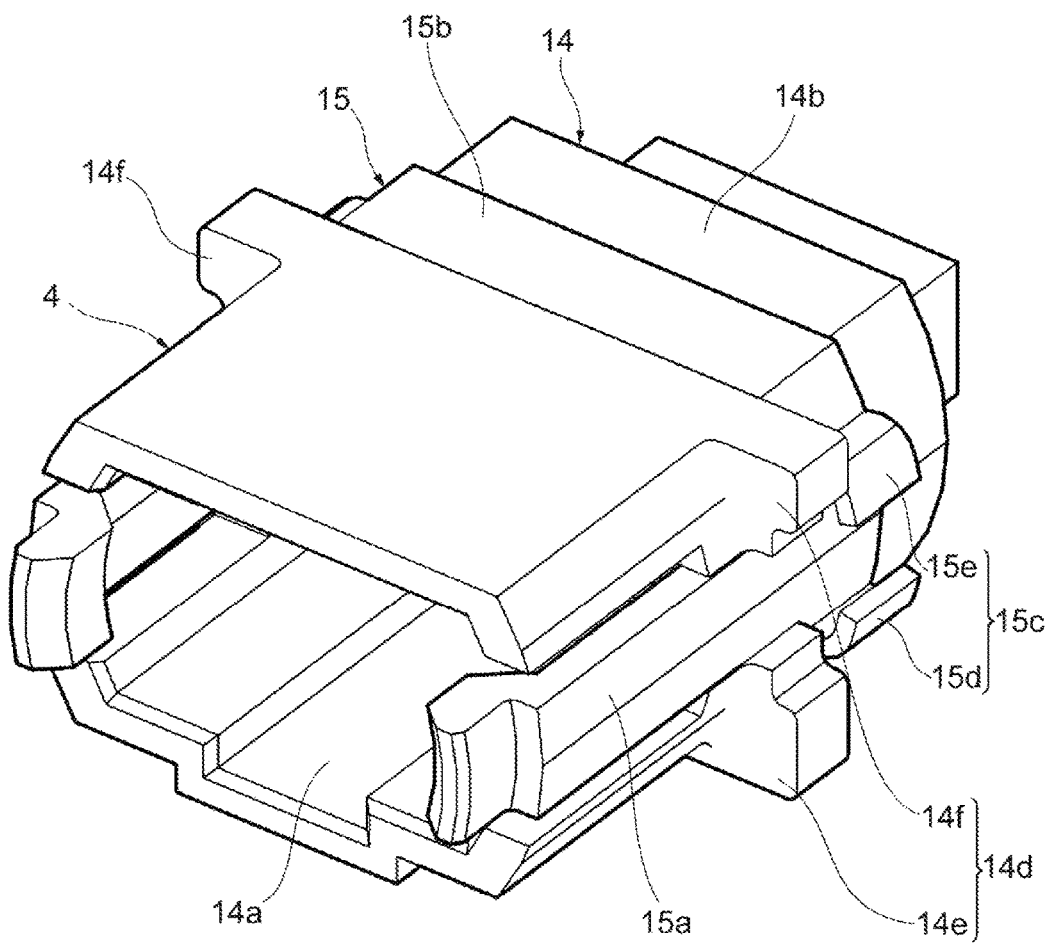
FIG. 5 is a perspective view of the MPO receptacle according to the embodiment of the present invention.
Figure 6:
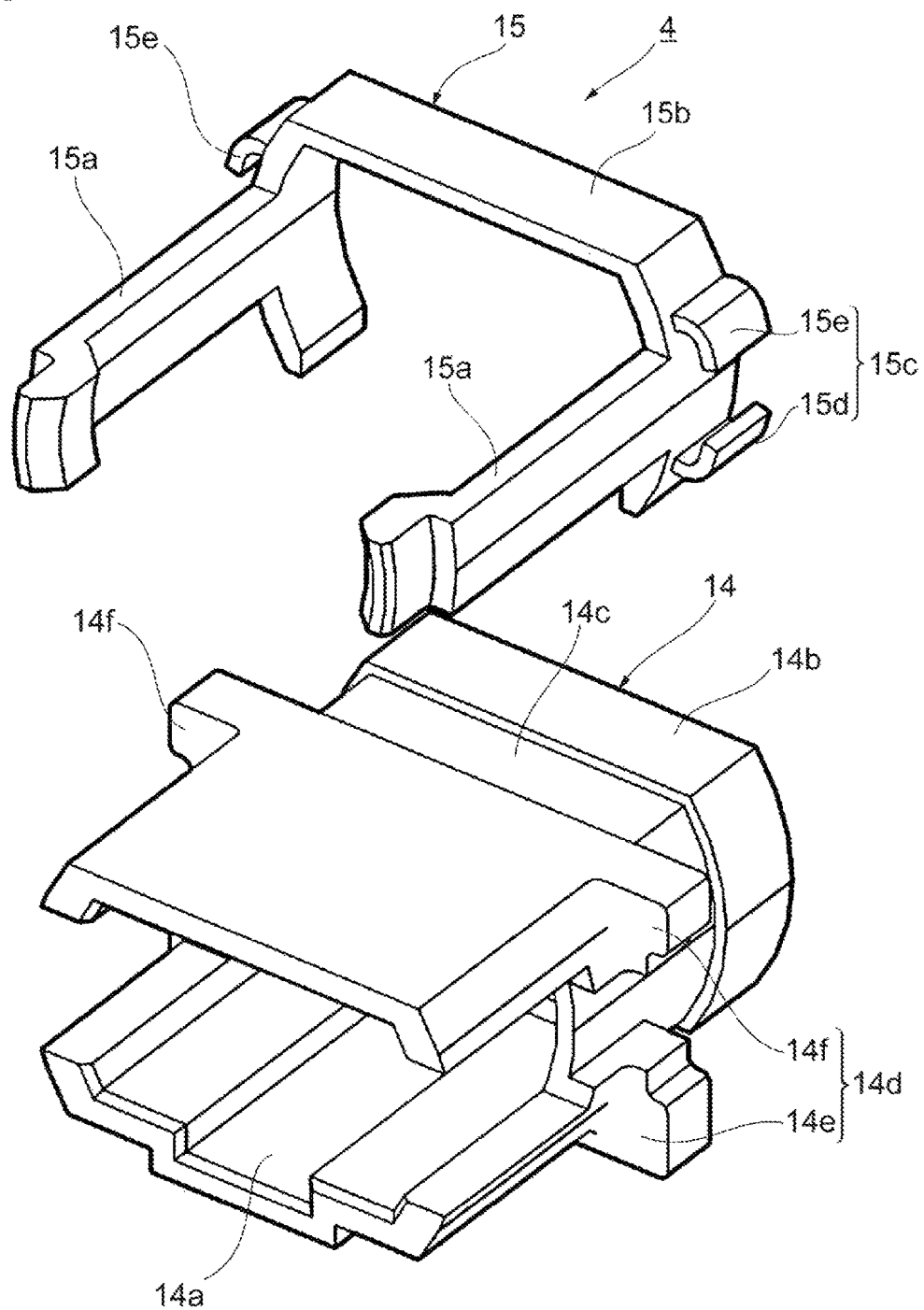
FIG. 6 is an exploded perspective view of the MPO receptacle of FIG. 5.

FIG. 4 is a perspective view of a front portion of the optical transceiver 1 on which the MPO receptacle 4 is mounted according to the embodiment of the present invention. FIG. 5 illustrates a state in which the MPO receptacle 4 of the embodiment of the present invention is assembled. FIG. 6 illustrates an exploded perspective view of the MPO receptacle 4. The MPO receptacle 4 includes a receptacle main body 14 and a latch 15. The latch 15 is made of a resin. The latch 15 provides flexibility when fixed to the lower housing 6. Meanwhile, the receptacle main body 14 is made of a metal. The receptacle main body 14 can easily be formed to have a predetermined shape.

To be more specific, the receptacle main body 14 is formed using a precision molding technique such as metal die casting. The receptacle main body 14 has an opening, in which an MPO connector is housed, at a front side thereof, and a recess 14a that positions the MPO connector to be housed in an upward/downward direction and is formed in an inner surface thereof. An outer surface 14b (a recess-free surface) made smooth is formed at a rear side of the receptacle main body 14. As will be described below, the outer surface 14b is sandwiched by the lower housing 6 and the upper housing 7, and thereby a high shield performance is obtained.

As illustrated in FIG. 6, the receptacle main body 14 has a groove 14c that encircles the outside of the receptacle main body 14 between the front and rear portions of the MPO receptacle 4 along a surface perpendicular to the longitudinal direction. The latch 15 (a band part 15b to be described below) can be fitted into the groove 14c. The receptacle main body 14 has flanges 14d in front of the groove 14c. The flanges 14d determine a position (a position in a direction parallel to the optical axis) on the MPO receptacle 4 in the longitudinal direction with respect to the lower housing 6. Each of the flanges 14d includes an upper flange 14e and a lower flange 14f. The upper and lower flanges 14e and 14f are separately provided at upper and lower sides of the receptacle main body 14. The latch has arms 15a that extends from a portion at which each of the tabs 15c of the band part 15b is provided toward the front side of the MPO receptacle 4. Each aim 15a of the latch 15 is interposed between the upper flange 14e and the lower flange 14f, and extends to the front side of the MPO receptacle 4. Tips of the arms 15a bend to the inside of the latch 15 to hold a rear wall of an external MT ferrule toward the receptacle main body 14.

The latch 15 positions the receptacle main body 14 with respect to the housings 6 and 7. The latch 15 has the band part 15b at the rear side of the MPO receptacle 4. The band part 15b is fitted into the groove 14c of the receptacle main body 14. The band part 15b has tabs 15e in a leftward/rightward direction (in a direction perpendicular to the upward/downward and the longitudinal direction) arranged one at a time. The tabs 15c can loosely fix the latch 15 and the receptacle main body 14 to the lower housing 6. One of the tabs 15c includes an upper tab 15d and a lower tab 15e. The upper tab 15d and the lower tab 15e are separately provided at an upper side and a lower side, respectively.

Figure 7:
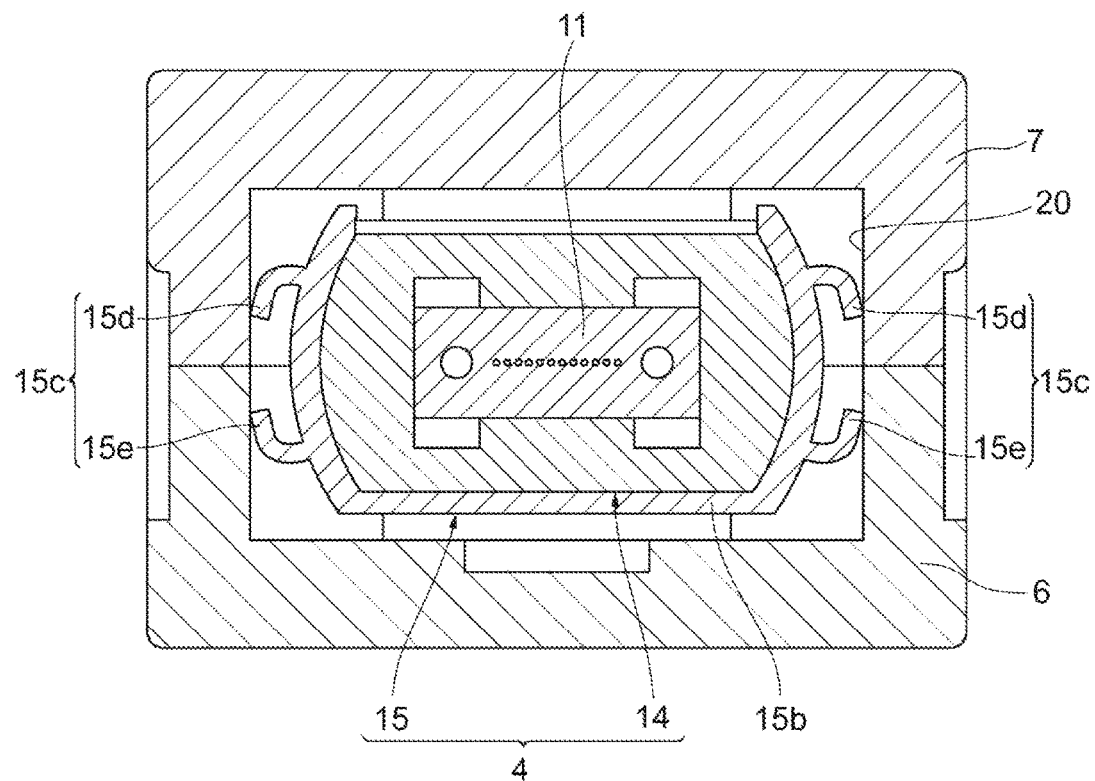
FIG. 7 is a sectional view illustrating a housing, the MPO receptacle, and a latch when a part of a groove is cut in a plane perpendicular to a longitudinal direction.

FIG. 7 is a sectional view of the lower housing 6, the upper housing 7, the MPO receptacle 4, and the MT ferrule 11 on a surface perpendicular to the longitudinal direction in a part of the groove 14c. As illustrated in FIG. 7, the upper and lower tabs 15d and 15e are in contact with the inner surface 20 of the upper and lower housings 7 and 6. The band part 15b surrounds a lower surface and opposite lateral surfaces of the receptacle main body 14 in a U shape.

The band part 15b may have a shape that covers the groove 14c of the receptacle main body 14 from a lower surface to a midway of the groove 14c, that is, cuts out a part of a lower side of an ellipse. In addition, the band part 15b may have an O shape that covers an entire circumference of the groove 14c of the receptacle main body 14. For example, the band part 15b may be formed of a resin material that is stretched by heating. In this case, in a state in which the band part 15b is heated and deformed with relative ease, the band part 15b is fitted into the groove 14c, and then a temperature of the band part 15b returns to room temperature. Thereby, an inner circumference of the band part 15b can be brought into tight contact with (be airtightly fitted to) an outer circumference of the groove 14c.

As illustrated in FIG. 6, to seize the latch 15 to the lower housing 6 and the upper housing 7, a thickness of each of the tabs 15c is thinner than that of each of the arms 15a. Thereby, the MPO receptacle 4 is loosely fixed to the lower housing 6 and the upper housing 7. For example, the MPO receptacle 4 can be slightly displaced from a seized position when a light force is applied, and return to a seized original position when the force is removed. Cross sections of the arms 15a when cut in a plane perpendicular to the longitudinal direction are formed to overhang outward in an arcuate shape following the geometry of the receptacle main body 14 (e.g., the outer surface 14b). Thereby, the arms 15a are easily widened in an outward direction, and restorability to return to an initial shape is improved. Since the upper and lower tabs 15d and 15e are formed to move toward each other when pressed from the outside, when the upper housing 7 is covered on the lower housing 6 in which the MPO receptacle 4 is incorporated, assembly work thereof can be performed in an accurate and smooth fashion.

Figure 8A:
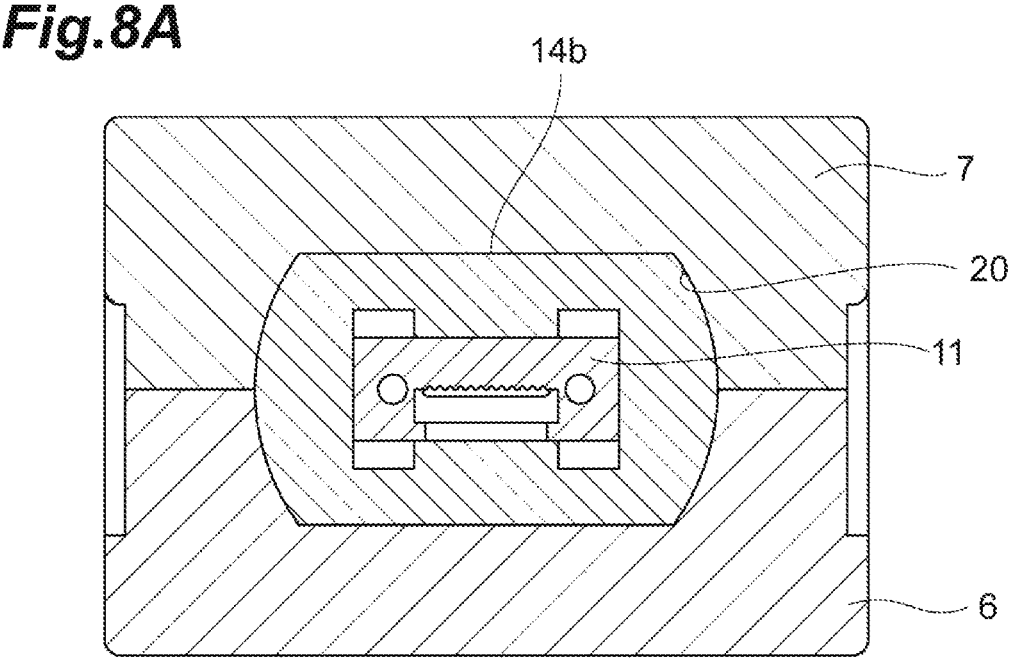
FIG. 8A is a sectional view illustrating the housing and the MPO receptacle when a part of an outer surface made smooth is cut in a plane perpendicular to the longitudinal direction.
Figure 8B:
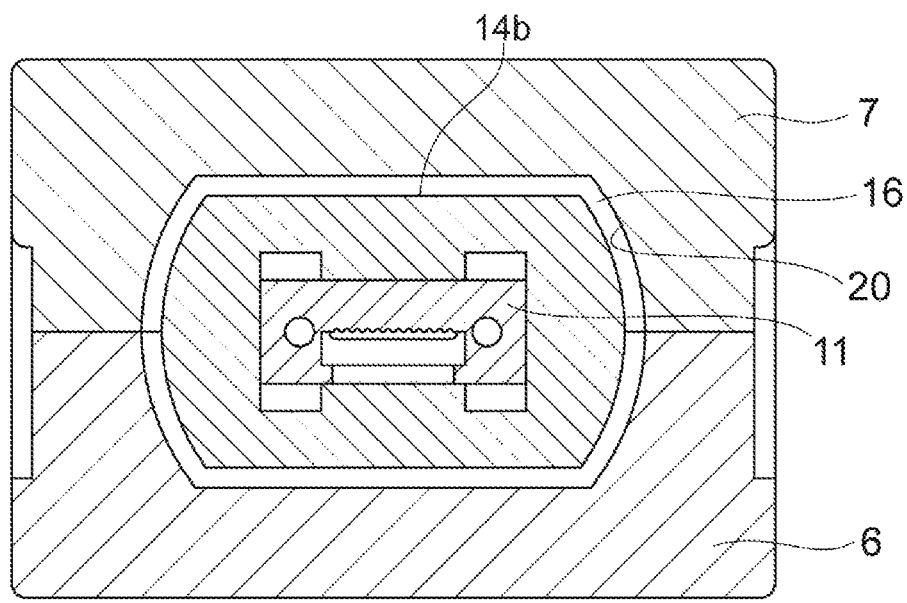
FIG. 8B is a sectional view illustrating the housing, the MPO receptacle, and a gasket when a part of the outer surface made smooth is cut in a plane perpendicular to the longitudinal direction.

FIGS. 8A and 8B are sectional views when a part of the outer surface 14b made smooth is cut in a plane perpendicular to the longitudinal direction. FIG. 8A illustrates a state in which the outer surface 14b and the inner surfaces 20 of the housings 6 and 7 are directly brought into contact with each other. FIG. 8B illustrates a state in which a shield effect is further improved by inserting a gasket 16 between the housings 6 and 7 and the outer surface 14b. Further, FIG. 9 illustrates the inner surface 20 of the lower housing 6 when the gasket 16 of FIG. 8B is provided. The outer surface 14b and the corresponding inner surfaces 20 of the housings 6 and 7 are smooth surfaces. Accordingly, the outer surface 14b and the inner surfaces 20 are in tight contact with each other. This can bring about the shield effect.

When the gasket 16 is not provided, a groove 17 for the gasket 16 may be omitted in FIG. 9. In addition, abutting surfaces 18 on which the tabs 15c of the latch 15 abut may be provided at the front sides of the inner surfaces 20 of the housings 6 and 7, and grooves 19 in which the flanges 14d of the lateral surface of the receptacle main body 14 fit may be formed in the front of the abutting surfaces 18.

FIG. 9 illustrates a configuration in which the groove 17 for the gasket 16 of the lower housing 6 side is provided. Alternatively, the groove 17 may be configured to be provided at the receptacle main body 14 side. In this case, after the gasket 16 is inserted throughout the circumference of the receptacle main body 14, the housings 6 and 7 can be assembled. The groove 17 can also be provided for both the receptacle main body 14 and the housings 6 and 7. However, after the groove 17 is formed in the receptacle main body 14, and the gasket 16 having a slightly greater diameter than a depth of the groove 17 is installed in the groove 17, a portion of the gasket 16 which is projected from the groove 17 is preferably crushed when assembled, and thereby the shield effect is improved.

Although the embodiment according to the present invention has been described, the present invention is not limited to the aforementioned embodiment. That is, the present invention can be variously modified and changed without departing from the spirit and scope of the present invention which are described in the claims, which is easily recognized by those skilled in the art.

What is claimed is:

1. An optical transceiver that is engageable with an MPO connector in a longitudinal direction, the optical transceiver comprising:
    a housing having a first inner surface on an inner side thereof, the housing being made of a metal; and
    an MPO receptacle having a receptacle main body and a latch, the receptacle main body having a first outer surface, the latch being configured to surround the receptacle main body in a U shape, the MPO receptacle being configured to engage with the MPO connector, the receptacle main body being made of a metal, the latch being made of a resin;
    wherein the receptacle main body is fixed to the housing such that the first outer surface of the receptacle main body makes surface contact with the first inner surface of the housing.

2. The optical transceiver according to claim 1, further comprising a gasket between the first outer surface and the first inner surface,
    wherein the gasket makes surface contact with the first outer surface and makes surface contact with the first inner surface.

3. The optical transceiver according to claim 1, wherein:
    the receptacle main body has flanges that determine the position of the receptacle main body in the longitudinal direction with respect to the housing; and
    the housing has grooves in which the flanges are housed.

4. The optical transceiver according to claim 3, wherein:
    the receptacle main body has a groove between the first outer surface and flanges; and
    the latch comes into contact with the groove of the receptacle main body and is fixed to the receptacle main body.

5. The optical transceiver according to claim 4, wherein:
    the latch has a band part on a side fitted to the MPO connector rather than the first outer surface;
    the housing further has a second inner surface on a side fitted to the MPO connector rather than the first inner surface; and
    the band part of the latch has tabs abutting on the second inner surface.

6. The optical transceiver according to claim 5, wherein:
the latch has arms each extending from a portion at which each of the tabs is provided; and
each arm has tip bending to the inside of the latch to hold the MPO connector.

7. The optical transceiver according to claim 6,
wherein the receptacle main body has a recess in an inside thereof, the recess being configured to position the MPO connector in an upward/downward direction.

8. The optical transceiver according to claim 1, wherein:
the receptacle main body has a groove between the first outer surface and flanges; and
the latch comes into contact with the groove of the receptacle main body and is fixed to the receptacle main body.

9. The optical transceiver according to claim 1, wherein:
the latch has a band part on a side fitted to the MPO connector rather than the first outer surface;
the housing further has a second inner surface on a side fitted to the MPO connector rather than the first inner surface; and
the band part of the latch has tabs abutting on the second inner surface.

10. The optical transceiver according to claim 9, wherein:
each of the tabs includes an upper tab and a lower tab;
the housing includes an upper housing and a lower housing; and
the upper tab abuts on the second inner surface of the upper housing side, and the lower tab abuts on the second inner surface of the lower housing side.

11. The optical transceiver according to claim 9, wherein:
the latch has arms each extending from a portion at which each of the tabs is provided; and
each arm has tip bending to the inside of the latch to hold the MPO connector.

12. The optical transceiver according to claim 1,
wherein the receptacle main body has a recess in an inside thereof, the recess being configured to position the MPO connector in an upward/downward direction.

\* \* \* \* \*